US011984658B2

(12) United States Patent
Berg

(10) Patent No.: US 11,984,658 B2
(45) Date of Patent: May 14, 2024

(54) ANTENNA DEVICE

(71) Applicant: Sivers Wireless AB, Kista (SE)

(72) Inventor: Håkan Berg, Harestad (SE)

(73) Assignee: SIVERS WIRELESS AB (SE)

( * ) Notice: Subject to any disclaimer, the term of this patent is extended or adjusted under 35 U.S.C. 154(b) by 214 days.

(21) Appl. No.: 17/638,834

(22) PCT Filed: Aug. 31, 2020

(86) PCT No.: PCT/EP2020/074248

§ 371 (c)(1),
(2) Date: Feb. 27, 2022

(87) PCT Pub. No.: WO2021/038110

PCT Pub. Date: Mar. 4, 2021

(65) Prior Publication Data

US 2022/0278465 A1 Sep. 1, 2022

(30) Foreign Application Priority Data

Aug. 30, 2019 (EP) .................................... 19194584

(51) Int. Cl.
*H01Q 21/08* (2006.01)
*H01Q 9/04* (2006.01)
*H01Q 21/24* (2006.01)

(52) U.S. Cl.
CPC ............. *H01Q 21/08* (2013.01); *H01Q 9/045* (2013.01); *H01Q 21/24* (2013.01)

(58) Field of Classification Search
CPC ......... H01Q 21/08; H01Q 21/24; H01Q 9/045
See application file for complete search history.

(56) References Cited

U.S. PATENT DOCUMENTS 5,969,681 A * 10/1999 O'Neill, Jr. ............ H03H 7/461 455/283
2011/0291836 A1 12/2011 Deavours et al.

(Continued)

FOREIGN PATENT DOCUMENTS

CN 101 752 664 B 7/2013
KR 2010 0019778 A 2/2010

*Primary Examiner* — Raymond R Chai
(74) *Attorney, Agent, or Firm* — Condo Roccia Koptiw LLP

(57) ABSTRACT

The present invention relates to an antenna device comprising an antenna part having a patch with several edges, a first transmit path connected to a first connection port at a first edge of the patch, and a second transmit path connected to a second connection port at the first edge of the patch. The first and second connection ports are located at a distance from each other along the first edge, and a first transmitter and a second transmitter are connected to the antenna part. The first transmit path comprises a first signal combiner connected to the first and second transmitters and to the first connection port. The second transmit path comprises a second signal combiner connected to the first and second transmitters and to the second connection port. The first signal combiner is arranged to generate a difference between signals originating from the first and second transmitters. The second signal combiner is arranged to generate a sum of the signals originated from the first and second transmitters. Thereby, it is possible to simultaneously transmit two different signals. A method for transmitting a radio frequency signal by means of the device is provided as well.

17 Claims, 4 Drawing Sheets

(56) References Cited

U.S. PATENT DOCUMENTS

| | | | | |
|---|---|---|---|---|
| 2012/0188917 | A1* | 7/2012 | Knox | H01Q 1/2225 370/277 |
| 2013/0057449 | A1 | 3/2013 | Orihashi et al. | |
| 2016/0204517 | A1 | 7/2016 | Hu et al. | |
| 2019/0334253 | A1* | 10/2019 | Corman | H04B 7/0408 |
| 2019/0386397 | A1* | 12/2019 | Son | H01Q 21/0006 |
| 2020/0280127 | A1* | 9/2020 | Hormis | H01Q 25/001 |
| 2023/0015197 | A1* | 1/2023 | Wang | H03F 3/195 |

* cited by examiner

ANTENNA DEVICE

CROSS REFERENCE TO RELATED APPLICATIONS

This application is the National Stage Entry under 35 U.S.C. § 371 of Patent Cooperation Treaty Application No. PCT/EP2020/074248, filed Aug. 31, 2020, which claims priority from EP Application No. EP 19194584.9, filed Aug. 30, 2019, the contents of each of which are hereby incorporated by reference herein in their entireties.

FIELD OF THE INVENTION

The present invention relates to the field of radio frequency patch antenna devices.

BACKGROUND OF THE INVENTION

A patch antenna generally consists of a dielectric substrate sandwiched between a conductive and radiating patch on the top and a ground plane at the bottom of the substrate. Ordinary materials for the patch are copper and gold. Typically, the patch is a square, though it can have almost any shape, and it is fed close to one edge thereof. If it is resonant there will be a standing wave across it where the current is at maximum at the middle of the patch and the voltage will have maxima at the edges, see FIG. 1. If the ratio of the current and voltage is properly matched the patch will radiate effectively. The feeding can be done in several ways but an electric connection port at an edge of the patch, such as by means of a microstrip connection, or a magnetic connection port through a slot under the patch, such as by means of a microstrip extending below the substrate to the slot, is common. Other feeders, such as a coaxial cable, are sometimes used as well.

In order to transmit a signal with both horizontal and vertical E-fields, or in order to send two different transmit signals with the same antenna, the patch antenna is realized as a dual-polarized antenna. Then, a further connection port is provided. An additional electric connection is made at another edge, adjacent to and perpendicular to the edge of the first connection. An additional magnetic connection is made by means of an additional slot perpendicular to and crossing the first slot. Thus, traditionally, dual-polarized antennas are realized as one patch independently fed by two transmit paths.

If two transmitters that can be turned on or off and are connected to a respective one of the connection ports, the transmitted power of the patch antenna is limited to the power from one of them. If both transmitters are active to transmit a diagonal polarization, the patch is forced to resonate in a diagonal direction which is not optimal. If it was, patches would be designed to resonate diagonally.

US 2013/0057449 discloses such a patch antenna having two electric connection ports connected to a single patch. The connection ports are connected to first and second excitation units of the patch, generating first and second linearly polarized waves, being orthogonal to each other. The generated output signal is divided into two signals, which are fed to the respective first and second excitation units.

SUMMARY OF THE INVENTION

It would be advantageous to increase the efficiency of the antenna. To address this issue, in a first aspect of the invention there is provided an antenna device comprising an antenna part having a patch with several edges, a first transmit path connected to a first connection port at a first edge of the patch, and a second transmit path connected to a second connection port at the first edge of the patch, wherein the first and second connection ports are located at a distance from each other along the first edge, and a first transmitter and a second transmitter connected to the antenna part By connecting both transmit paths at the same edge it is possible to obtain a mode where both connections are driven in phase. This gives a higher impedance at each port compared to when the patch is driven by one connection only. They can also be driven in a differential mode resulting in an orthogonal polarization compared to the first case.

In accordance with an embodiment of the antenna device, the first transmit path comprises a first signal combiner connected to the first and second transmitters and to the first connection port, wherein the second transmit path comprises a second signal combiner connected to the first and second transmitters and to the second connection port, wherein the first signal combiner is arranged to generate a difference between signals originating from the first and second transmitters, and wherein the second signal combiner is arranged to generate a sum of the signals originated from the first and second transmitters. By means of the signal combiners it is possible to use the antenna device to simultaneously transmit two radio frequency signals in orthogonal polarizations.

In accordance with an embodiment of the antenna device the first transmit path comprises a first phase shifter and the second transmit path comprises a second phase shifter. Thereby, a simple control of the transmitted signal is obtained.

In accordance with an embodiment of the antenna device, the first phase shifter is connected to the first signal combiner and to the first connection port, and wherein the second phase shifter is connected to the second signal combiner and to the second connection port.

In accordance with an embodiment of the antenna device, the first phase shifter is connected to the first transmitter and to the first and second signal combiners, and the second phase shifter is connected to the second transmitter and to the first and second signal combiners.

In accordance with an embodiment of the antenna device, it comprises a beam controller connected to the phase shifter of each transmit path. Thereby a controlled beamforming is possible. When the antenna device comprises multiple antenna parts, preferably, the patches of the antenna parts are arranged as an array of desired configuration.

In accordance with an embodiment of the antenna device the first and second transmit paths of each patch are arranged to feed the same transmit signal to the patch in several different modes, including a common mode and a differential mode.

In a second aspect of the invention there is provided a method of transmitting a radio frequency signal, comprising providing an antenna device comprising an antenna part having a patch with several edges, a first transmit path connected to a first connection port of a first edge of the patch, and a second transmit path connected to a second connection port of the first edge of the patch, wherein the first and second connection ports are located at a distance from each other along the first edge. Further, the method comprises generating a first transmit signal by means of a first transmitter, and generating a second transmit signal by means of a second transmitter and feeding the first and second transmit signals to the antenna part.

This method provides the same advantages and solve the same problems as the above antenna device.

In accordance with an embodiment of the method it further comprises generating a sigma signal comprising a sum of the first transmit signal and the second transmit signal; generating a delta signal comprising a difference between the first transmit signal and the second transmit signal; feeding the sigma signal to the first connection port; and feeding the delta signal to the second connection port, thereby transmitting a first radio frequency signal with a first polarization, and a second radio frequency signal with a second polarization orthogonal to the first polarization from the patch.

BRIEF DESCRIPTION OF THE DRAWINGS

The invention will now be described in more detail and with reference to the appended drawings in which.

DESCRIPTION OF EMBODIMENTS

Figure 3:
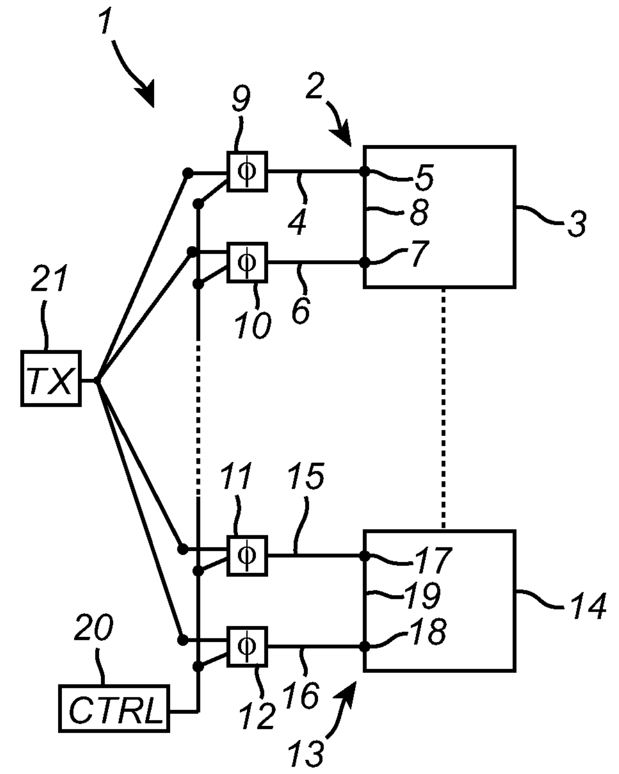
FIG. 3 is a block diagram of the structure of FIG. 2.
Figure 5:
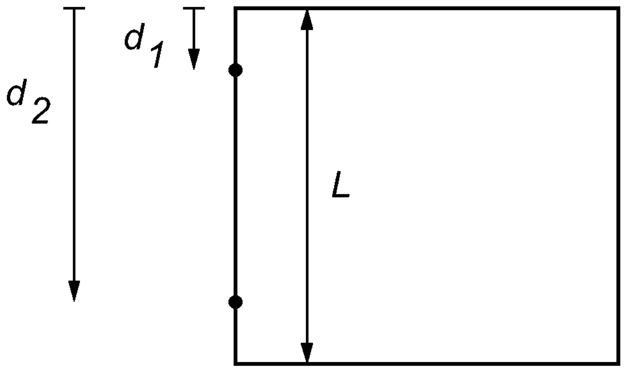
FIG. 5 illustrates measures related to a patch.

A first structure of an antenna device 1, shown in FIG. 3, shows some principles for using two connection ports associated with the same edge of a patch. The antenna device 1 comprises an antenna part 2, having a patch 3 with several edges. In the figures the patches are illustrated as square patches. Many different shapes are feasible as understood by the person skilled in the art, however rectangular or modified rectangular shapes are preferred. The antenna part 2 further comprises a first transmit path 4, connected to a first connection port 5 of the patch 3, and a second transmit path 6 connected to a second connection port 7 of the patch 3. The first and second connection ports 5, 7 are provided at a first edge 8 of the patch 3, and they are located at a distance from each other along that first edge 8. Referring to FIG. 5, if the first connection port 5 is positioned at a distance d1 from one end of the first edge 8, the second connection port 7 is positioned at a distance d2 from the same end, where d2>d1. There are no particular relations between d1 and d2 or between those distances and the total length L of the edge that are generally preferable, but the most desirable measures have to be determined for each individual situation as a part of the design work. They depend on impedance levels, which in turn depend on substrate thickness, dielectric permittivity, etc. It is of course impractical to have them too close since there is no room for the feeding terminals. Additionally, it should be noted that the expression “at a first edge”, as used in the present application, includes positioning of the connection ports 5, 7 anywhere from exactly on the first edge 8 to a position displaced from the first edge 8 but still from a perspective of operation associable with the first edge 8. For instance, if coaxial feeding terminals are used, the connection ports 5, 7 are typically positioned at a distance from the edge displaced towards the centre of the patch 3. When microstrip feeds are used, the patch 3 is typically provided with insets at the sides of the microstrip in order to reduce the input impedance of the connection ports 5, 7.

A single antenna part 2 antenna device 1, where the antenna device 1 comprises a transmitter 21 connected to the antenna part 2, is a basic alternative for the antenna device 1. However, for further operational alternatives each transmit path 4, 6 of the antenna part 2 comprises a phase shifter 9, 10, and the antenna device 1 further comprises a beam controller 20 connected to the phase shifters 9, 10 for controlling the phase of the transmit signals fed to the respective first and second connection ports 5, 7.

Further, an advantageous application of the present invention is as an antenna array with beamforming capability. Hence, as also shown in FIG. 3, the antenna device 1 generally comprises further antenna parts 13 forming a one-dimensional or two-dimensional array. Each further antenna part 13 also comprises first and second transmit paths 15, 16 respectively connected to first and second connection ports 17, 18, arranged at a first edge 19 of the patch 14. Each transmit path 15, 16 of each further antenna part 13 comprises a phase shifter 11, 12 connected to the beam controller 20. The phase shifters 11, 12 are connected to the transmitter 21 as well.

Figure 4:
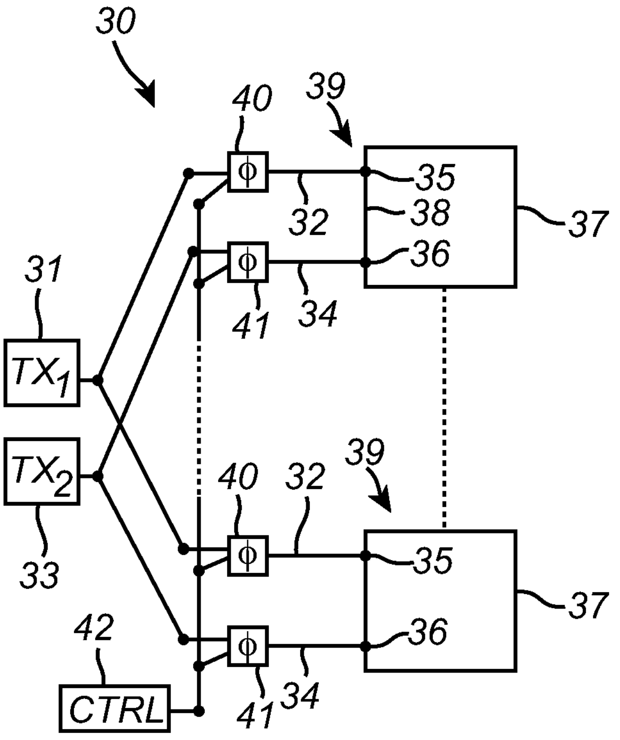
FIG. 4 is a block diagram of another structure of the antenna device.

In accordance with a second structure of the antenna device 30, as shown in FIG. 4, the antenna device 30 comprises two transmitters, i.e. a first transmitter 31 and a second transmitter 33. The first transmitter is connected to the first transmit path 32, and the second transmitter 33 is connected to the second transmit path 34. When multiplied to an antenna array comprising several antenna parts 39, the first transmitter is connected to the first transmit path 32 of each antenna part 39, and the second transmitter 33 is connected to the second transmit path 34 of each antenna part 39. The beam controller 42 is connected to the phase shifters 40, 41 as in the first structure.

Figure 7:
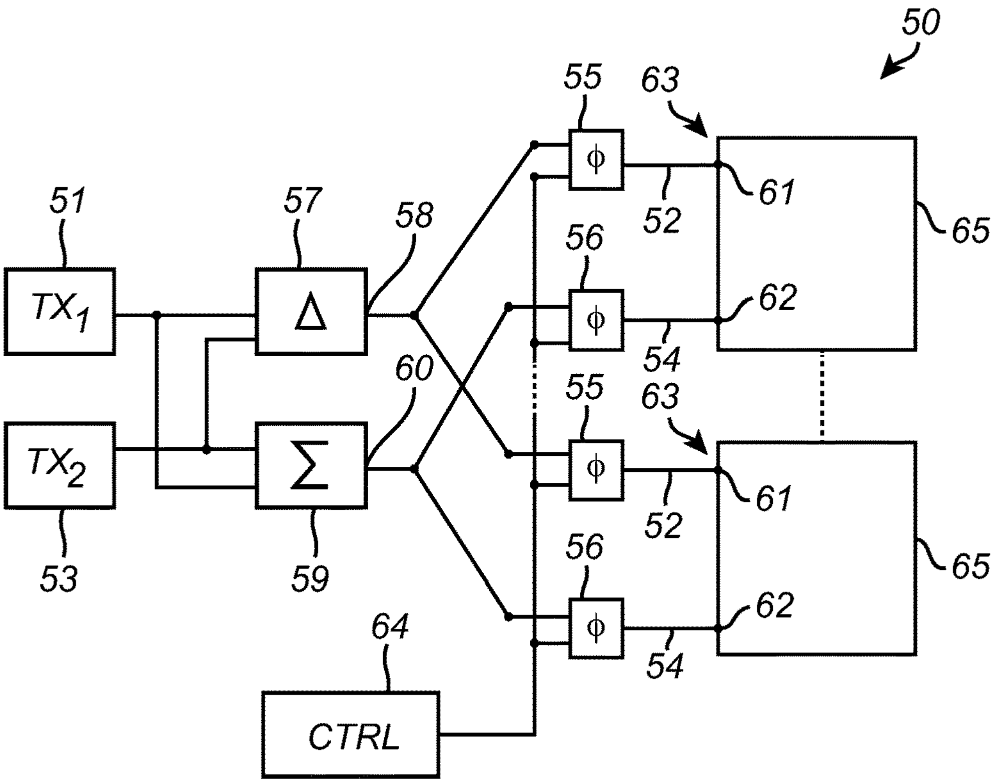
FIGS. 7 and 8 are block diagrams of further structures of the antenna device.

In accordance with a third structure of the antenna device 50, as shown in FIG. 7, the antenna device 50 comprises one or more antenna parts 63, and a first transmitter 51 and a second transmitter 53 connected to the/each antenna part 63. More particularly, each antenna part 63 comprises a patch 65, a first transmit path 52 connected to a first connection port 61 of the patch, and a second transmit path 54 connected to a second connection port 62 of the patch 65. Like in the previous structure the connection ports 61, 62 are both associated with one and the same edge of the patch 65. The first transmit path 52 comprises a first phase shifter 55 connected to the first connection port 61, and a first signal combiner 57 connected to the first phase shifter 55. The second transmit path 54 comprises a second phase shifter 56 connected to the second connection port 62, and a second signal combiner 59 connected to the second phase shifter 56.

The first transmitter 51 is connected to both the first transmit path 52 and the second transmit path 54. The second transmitter 53 is connected to both the first transmit path 52 and the second transmit path 54 as well. More particularly, the first and second transmitters 51, 53 are connected to the signal combiners 57, 59. The first signal combiner 57 is a delta element, i.e. a subtractor arranged to generate an output signal, here called delta signal, constituting the difference between a first transmit signal received from the first transmitter 51 and a second transmit signal received from the second transmitter 53. The second signal combiner 59 is a sigma element, i.e. an adder arranged to generate an output signal, here called sigma signal, constituting the sum of the first transmit signal and the second transmit signal.

Further, similar to the other structures, the antenna device comprises a beam controller 64, which is connected to all phase shifters 55, 56.

When the antenna device 50 comprises several antenna parts 63, arranged in an array, the first transmitter 51 is connected to the first and second transmit paths 52, 54 of each antenna part 63, and the second transmitter 53 is connected to the first and second transmit paths 52, 54 of each antenna part 63. The beam controller 64 is connected to the phase shifters 55, 56 of all antenna parts 63 as in the other structures. More particularly, each antenna part 63 comprises a patch 65, and first and second phase shifters 55, 56 connected to the connection ports 61, 62 of the patch 65. The first signal combiner 57 is shared by all antenna parts 63, i.e. the output 58 of the first signal combiner 57 is connected to the first phase shifter 55 of each antenna part 63. Similarly, the second signal combiner 59 is shared by all antenna parts 63, i.e. the output 60 of the second signal combiner 59 is connected to the second phase shifter 56 of each antenna part 63.

Figure 8:
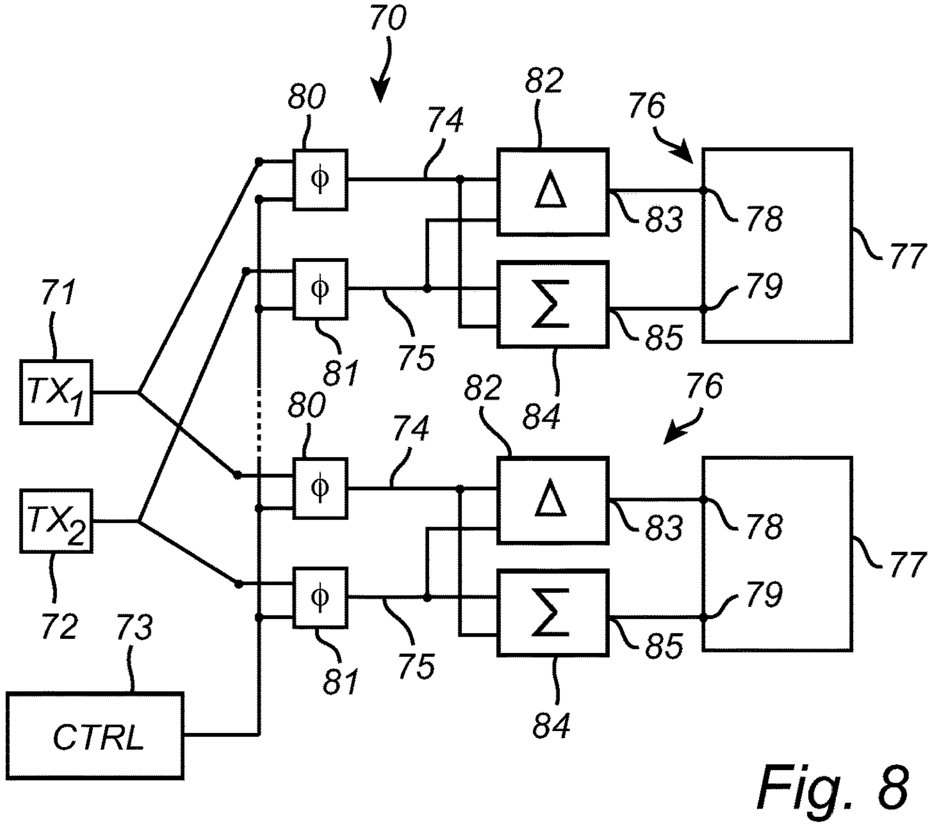

In accordance with a fourth structure of the antenna device 70, as shown in FIG. 8, the antenna device 70 comprises one or more antenna parts 76, and a first transmitter 71 and a second transmitter 72 connected to the/each antenna part 76. More particularly, each antenna part 76 comprises a patch 77, a first transmit path 74 connected to a first connection port 78 of the patch 77, and a second transmit path 75 connected to a second connection port 79 at the patch 77. Like in the previous structures the connection ports 78, 79 are both associated with one and the same edge of the patch 77. The first transmit path 74 comprises a first signal combiner 82 connected to the first connection port 78, and the second transmit path 75 comprises a second signal combiner 84 connected to the second connection port 79. Further, the first transmit path 74 comprises a first phase shifter 80 connected to the first signal combiner 82 as well as to the second signal combiner 84, and the second transmit path 75 comprises a second phase shifter 81 connected to both the second signal combiner 84 and the first signal combiner 82.

The first transmitter 71 is connected to both the first transmit path 74 and the second transmit path 75. Correspondingly, the second transmitter 72 is connected to the first transmit path 74 and, via the second phase shifter 81, to the second transmit path 75. More particularly, the first transmitter 71 is connected to the first phase shifter 80, and, via the first phase shifter 80, to the second signal combiner 84. The second transmitter 72 is connected to the second phase shifter 81 and, via the second phase shifter 81, to the first signal combiner 82. Similar to the third structure, the first signal combiner 82 is a delta element, and the second signal combiner 84 is a sigma element.

Further, similar to the other structures, the antenna device 70 comprises a beam controller 73, which is connected to all phase shifters 80, 81.

The first structure of the antenna device 1 is operated as follows. For each antenna part 2, 13, first and second transmit signals from the transmitter 21 are fed to the patch 3, 14 via the first and second transmit paths 4, 6, 15, 16. The signals originate from the same source. If the first and second transmit signals are fed to the patch 3, 14 in common-mode, that is with the same phase and the same amplitude, the patch 3, 14 works similar to a patch of the prior art having a single port at the edge, but the impedance in each connection port 5, 7, 17, 18 is twice the impedance of the single port. However, the total power transmitted by the patch 3, 14 is doubled as well. That is, the power from both transmit signals is added in phase and thereby the transmitted power is doubled. The total transmitted power is the sum of the power in both connection ports 5, 7, 17, 18 since they work in parallel. The radio frequency signal transmitted from the patch 3 will have a y polarization, see FIG. 6.

Figure 1:
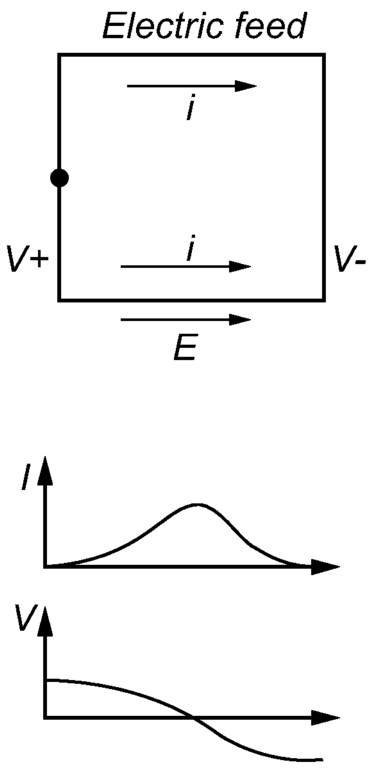
FIG. 1 illustrates patch antenna fundamentals.
Figure 2:
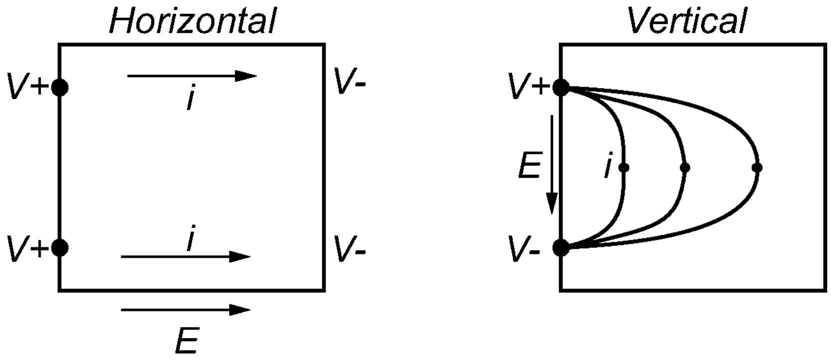
FIG. 2 illustrates the operation principle for a patch of a structure of an advantageous antenna device.

If the first and second transmit signals are fed to the two ports 5, 7 in differential mode, i.e. the same amplitude but opposite polarity, which means a phase difference of 180 degrees, there will be a current maximum in the symmetry plane of the ports 5, 7, as shown in the right hand scheme of FIG. 2. In this case as well the transmitted power will be the sum of the power of both ports 5, 7. The radio frequency signal transmitted from the patch 3 will have an x polarization, see FIG. 6. Thus, for both polarizations, i.e. x as well as y polarization, of the resulting transmitted radio frequency signal, the output power will be the sum of the power of the two ports 5, 7.

In addition to controlling the relative phase between the first and second transmit signals fed to each patch 3, 14, the beam controller 20 differentiates the phases of the antenna parts 2, 13 in relation to each other in order to obtain a desired beam forming to the final signal transmitted from the antenna device 1. Since this is done according to methods well known to the person skilled in the art it will not be further described herein.

In the second structure, shown in FIG. 4, when two transmitters 31, 33 are used to transmit the same signal, the total power delivered by the two transmitters 31, 33 is transmitted by the patch 37. A first transmitter Tx1, 31 is included in the first transmit path 32 of each antenna part 39 and it is connected to the first phase shifter 40 of each antenna part 39, which first phase shifter 40 in turn is connected to the first port 35. A second transmitter Tx2, 33 is included in the second transmit path of each antenna part 39 and it is connected to the second phase shifter 41 of each antenna part 39, which second phase shifter 41 in turn is connected to the second port 36. The first and second transmitters 31, 33 are transmitting the same signal, and the phase controller 42 controls the phases of the phase shifters 40, 41 to form the beam direction and also to determine the polarization.

Figure 6:
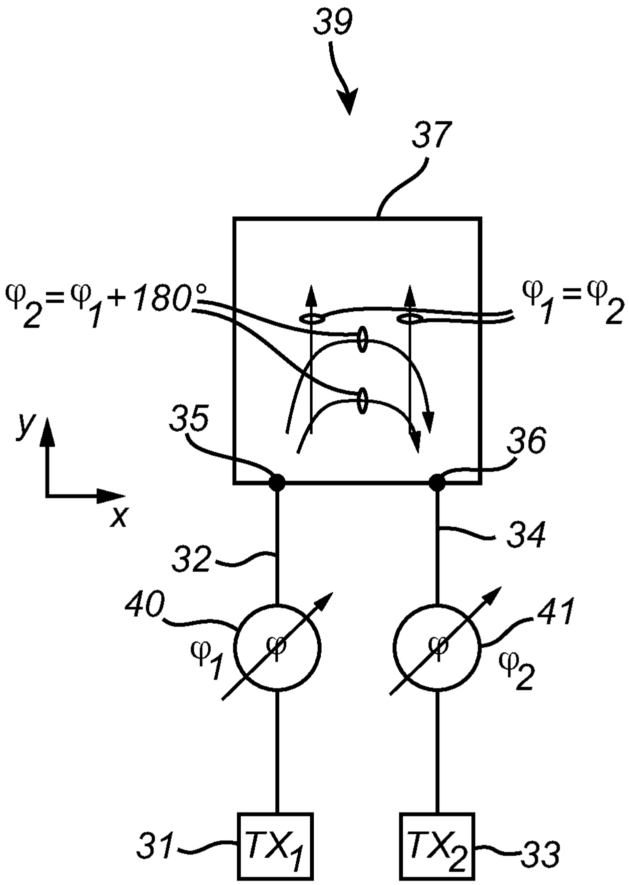
FIG. 6 is a further block diagram for illustrating the structure of FIG. 4.

More particularly, as illustrated in FIG. 6, showing one antenna part 39 of the antenna device 30, when the phase difference between the first and second phase shifters 40, 41 is zero then the patch becomes polarized in the y-direction. When the phase difference is 180 degrees the patch 37 becomes polarized in the x-direction. In both polarizations, the total transmitted power will be the sum of the power of both antenna paths. In contrast, in the prior art antennas where two ports are arranged at different edges of the patch, usually the ports are alternatively activated, causing transmission with x or y polarization, or they are activated in common causing transmission with diagonal polarization with the power of one transmit signal in both cases, since when both ports are activated they do not add in phase.

The beam forming is provided with the same phase controller 42 by providing phase differences between the antenna parts 39 according to any suitable common technology beam forming method as known to the person skilled in the art. The third structure of the antenna device operates as follows. The first transmit signal output from the first transmitter 51 is fed to the first signal combiner 57 and to the second signal combiner 59. The second transmit signal output from the second transmitter 53 is fed to the second signal combiner 59. For each antenna part 63, the delta signal output from the first signal combiner 57 is fed to the first phase shifter 55 of the first transmit path 52, and further to the first connection port 61 of the path 65. The sigma signal output from the second signal combiner 59 is fed to the second phase shifter 56 and further to the second connection port 62. The first and second phase shifters 55, 56 may be used to mutually phase shift the delta and sigma signals in order to change polarity on the radio frequency signals transmitted from the patch 65 or, in case of several antenna parts 63, in order to steer the beam transmitted from the antenna device 50.

If the delta signal is denoted txΔ, the sigma signal is denoted txΣ, the first transmit signal is denoted tx1, and the second transmit signal is denoted tx2, then:

$$tx\Delta = tx1 - tx2 \qquad \text{(eqn. 1)}$$

$$tx\Sigma = tx1 + tx2 \qquad \text{(eqn. 2)}$$

Thus, the first transmit signal tx1 is received in common mode at the first and second connection ports 61, 62, and the second transmit signal tx2 is received in differential mode. Consequently, as explained above, the first transmit signal tx1 is transmitted from the patch 65 as a radio frequency signal in y polarization and the second transmit signal tx2 is transmitted in x polarization from the patch 65. Both signals are transmitted simultaneously. If desired, by means of the phase shifters 55, 56 the polarization of the transmitted signals can be switched such that the first transmit signal tx1 is transmitted in x polarization and the second transmit signal tx2 is transmitted in y polarization.

Similar to the third structure the fourth structure of the antenna device 70 generates two simultaneously transmitted radio frequency signals, which are sent with orthogonal polarizations, i.e. x and y polarizations, one originating from the first transmitter 71 and the other originating from the second transmitter 72. A difference in comparison with the third structure, caused by the shifted positions of the signal combiner 82, 84 and the phase shifter 80, 81 of each transmit path 74, 75, is an improved isolation between the transmit signals tx1 and tx2.

As obvious to the person skilled in the art, the antenna device can be used to receive radio frequency signals as well. In the antenna devices 50, 70 according to the third and fourth structures, the inherent isolation between the two polarisations in the patch 65, 77 makes the transmitted signal tx1 independent of the impedance in the transmitter TX2. This allows for transmitting and receiving signals simultaneously in different polarisations, or in time-division mode, without suffering from poor impedance matching in the path that is not active.

Consequently, in accordance with the present invention, an antenna array is designed that can make use of a number of beamforming channels to control both beam direction and polarization while transmitting power from all channels in both polarizations. By using two transmitters and incorporating the signal combiners one can control the polarization of the two transmitters relative to each other.

One advantage of this solution over previous solutions is that it allows to transmit twice the power in two polarizations.

While the invention has been illustrated and described in detail in the drawings and foregoing description, such illustration and description are to be considered illustrative or exemplary and not restrictive. The invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

The invention claimed is:

1. An antenna device, comprising:
a patch with a plurality of edges;
a first connection port at a first edge of the patch;
a second connection port at the first edge of the patch, and spaced apart from the first connection port by a distance along the first edge;
a first transmitter connected to at least the first connection port via a first transmit path; and
a second transmitter connected to at least the second connection port via a second transmit path
wherein the first transmit path comprises a first signal combiner connected to the first and second transmitters and to the first connection port, and the second transmit path comprises a second signal combiner connected to the first and second transmitters and to the second connection port.

2. The antenna device of claim 1, wherein the first signal combiner is arranged to generate a difference between signals originating from the first and second transmitters, and the second signal combiner is arranged to generate a sum of the signals originating from the first and second transmitters.

3. The antenna device of claim 1, wherein the first transmit path comprises a first phase shifter and the second transmit path comprises a second phase shifter.

4. The antenna device of claim 3, wherein the first phase shifter is connected to the first signal combiner and to the first connection port, and the second phase shifter is connected to the second signal combiner and to the second connection port.

5. The antenna device of claim 3, wherein the first phase shifter is connected to the first transmitter and to the first and second signal combiners, and the second phase shifter is connected to the second transmitter and to the first and second signal combiners.

6. The antenna device of claim 1, further comprising a beam controller.

7. The antenna device of claim 3, further comprising a beam controller connected to the first phase shifter and the second phase shifter.

8. The antenna device of claim 1, further comprising:
a second patch with a plurality of edges;
a first connection port at a first edge of the second patch; and
a second connection port at the first edge of the second patch, and spaced apart from the first connection port of the second patch by a distance along the first edge of the second patch;
wherein the first transmitter is connected to the first connection port of the second patch and the second transmitter is connected to the second connection port of the second patch.

9. A method of transmitting a radio frequency signal, comprising:
generating a first transmit signal via a first transmitter;

generating a second transmit signal via a second transmitter;

feeding the first and second transmit signals to the same edge of an antenna patch, wherein the patch has at least two spaced apart connection ports with respective transmit paths;

generating a sigma signal comprising a sum of the first transmit signal and the second transmit signal;

generating a delta signal comprising a difference between the first transmit signal and the second transmit signal;

feeding the sigma signal to a first connection port of the at least two spaced apart connection ports; and feeding the delta signal to a second connection port of the at least two spaced apart connection ports, thereby transmitting a first radio frequency signal with a first polarization, and a second radio frequency signal with a second polarization orthogonal to the first polarization from the patch.

10. The method of claim 9, further comprising controlling a phase difference between the first and second transmit signals.

11. The method of claim 10, wherein the phase difference is controlled to zero degrees.

12. The method of claim 10, wherein the phase difference is controlled to 180 degrees.

13. The method of claim 9, wherein the first and second transmit signals are subjected to phase shifting before said generation of sigma and delta signals.

14. The method of claim 9, wherein the sigma signal and the delta signal are subjected to phase shifting before being fed to the first and second connection ports.

15. The method of claim 9, further comprising:

feeding the first and second transmit signals to the same edge of a second antenna patch, wherein the second patch has at least two spaced apart connection ports with respective transmit paths;

controlling a phase difference between the first patch and the second patch to obtain beamforming.

16. An antenna device, comprising:

at least two transmitters;

at least two patches each having a plurality of edges, wherein each patch has:

a first connection port at a first edge of the patch; and a second connection port at the first edge of the patch spaced apart from the first connection port; and at least one signal combiner arranged to generate a difference between signals originating from the at least two transmitters, and at least another signal combiner arranged to generate a sum of the signals originating from the at least two transmitters, wherein each transmitter is operably connected to each patch.

17. The antenna device of claim 16, further comprising phase shifters connected to the signal combiners.

* * * * *